Jan. 25, 1966      A. W. HARRISON      3,231,051
                  SPOT TYPE DISC BRAKES
Filed April 14, 1964                4 Sheets-Sheet 1
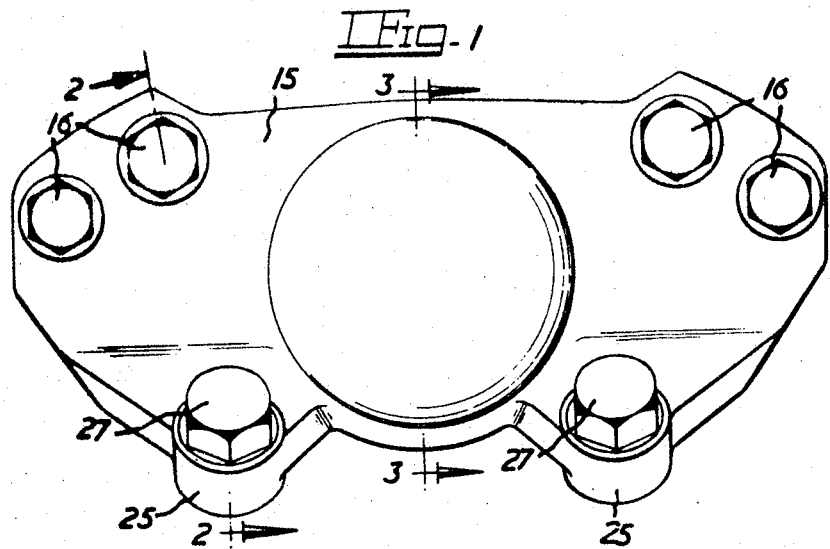
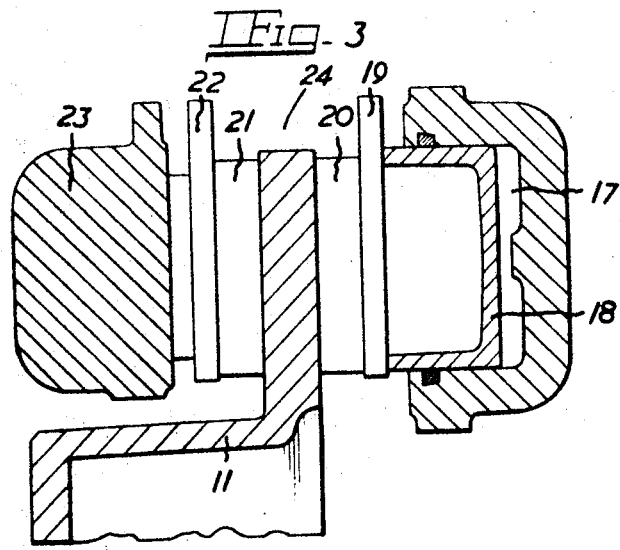
Anthony William Harrison
BY Scrivener Parker Scrivener & Clarke

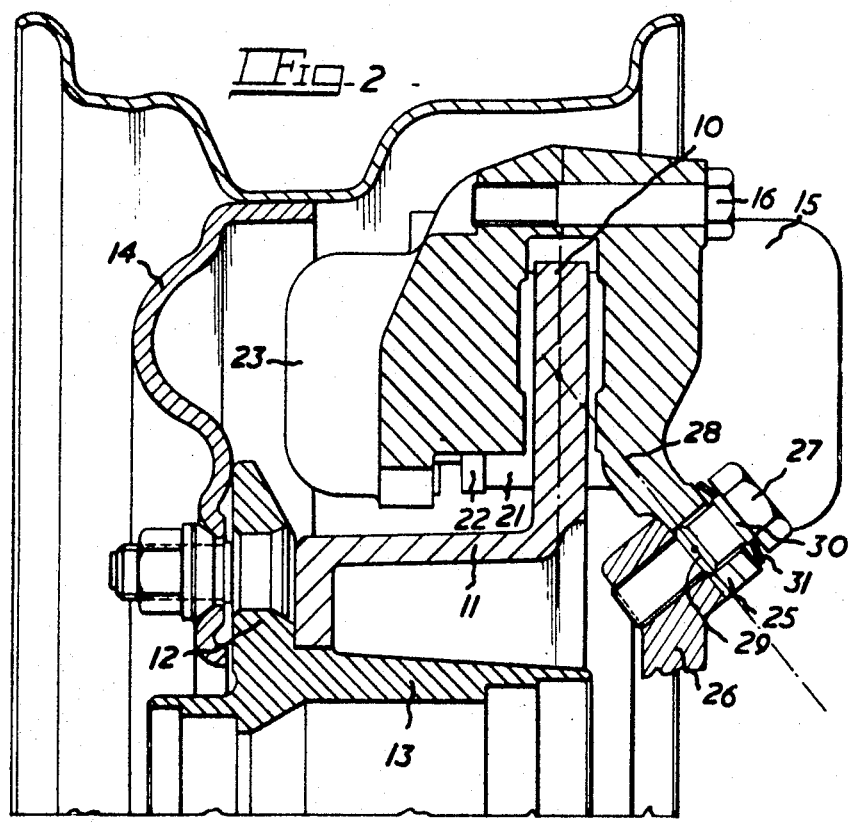

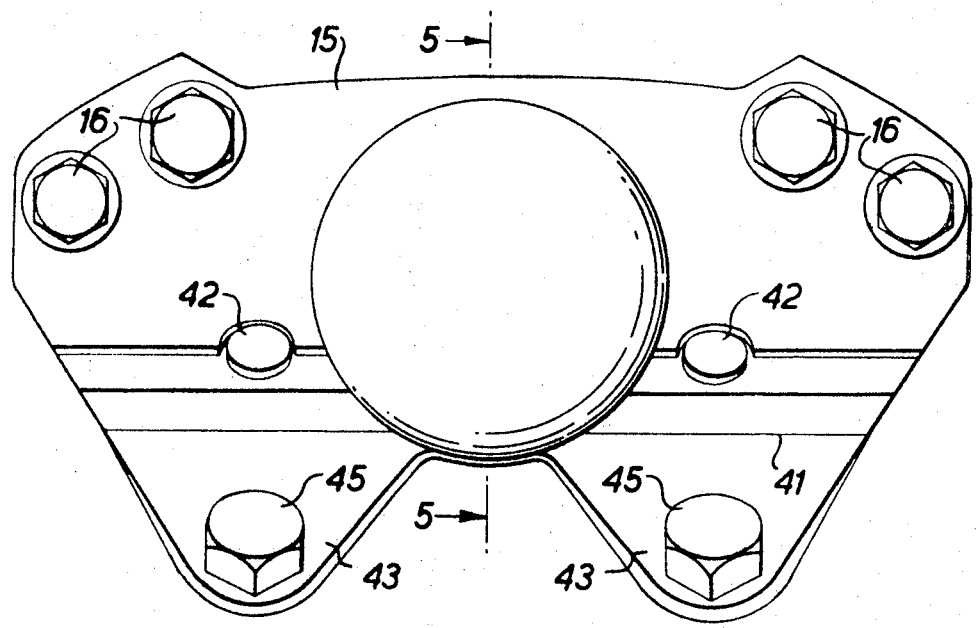

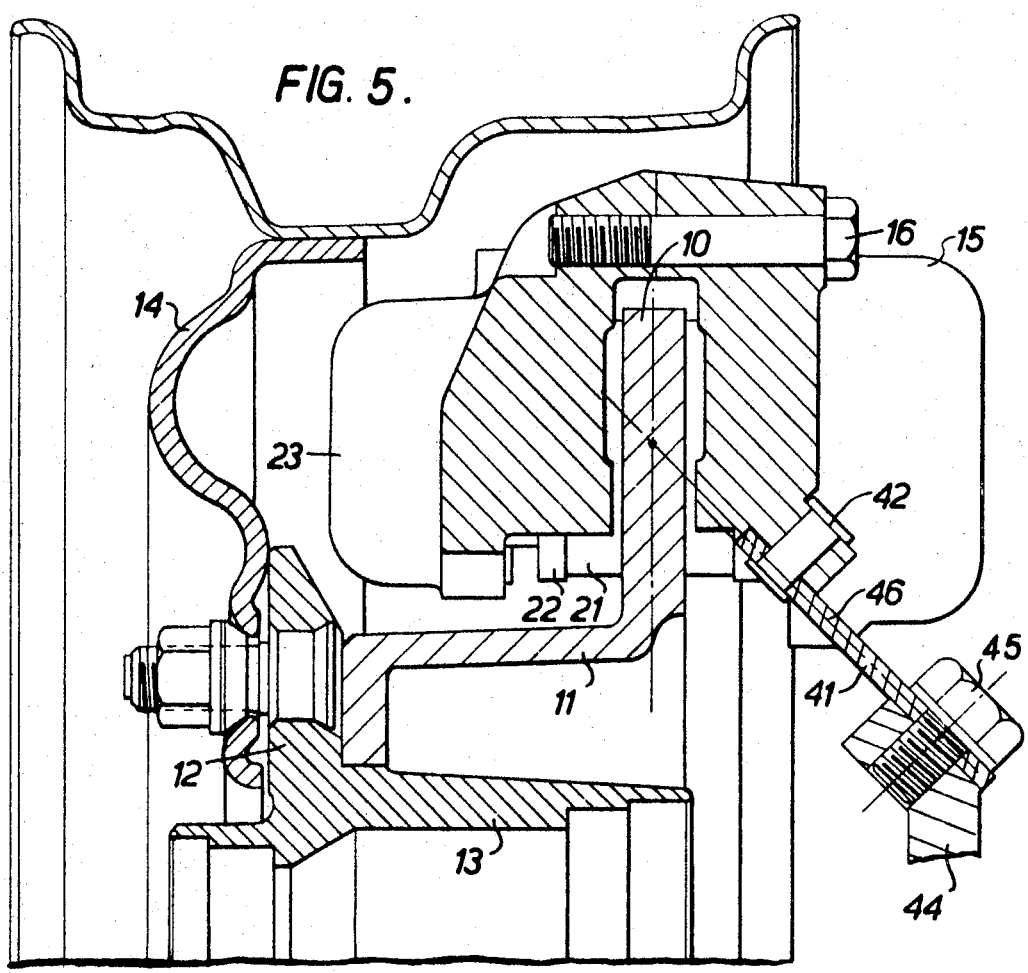

United States Patent Office 3,231,051
Patented Jan. 25, 1966

3,231,051
SPOT TYPE DISC BRAKES
Anthony William Harrison, Birmingham, England, assignor to Girling Limited, Tyseley, Birmingham, England, a British company
Filed Apr. 14, 1964, Ser. No. 359,688
4 Claims. (Cl. 188—73)

This invention relates to improvements in disc brakes of the kind in which friction pads adapted to engage opposite faces of a rotatable disc are located in a caliper which straddles a portion of the periphery of the disc and is so mounted that it is permitted a limited rocking movement relative to the disc which is fixed axially. One friction pad is mounted in a limb of the caliper for movement towards and away from the disc and is directly actuated by hydraulic or other means located in one limb of the caliper while the other pad is applied to the opposite face of the disc by the reaction on the caliper.

When a pad in such a brake engages a rotating disc, the pad tends to be carried forward with the disc until either the pad or a backing plate on which the pad is mounted meets a non-rotatable abutment secured to or integral with a non-rotatable member such as the caliper. The force from the engagement of the pad with the disc is known as the drag force. The resultant drag force, from the engagement of pads on opposite sides of the disc with the disc, which is taken by the abutment lies in a plane within the disc and the drag force can be said to act at a single point where this plane is intersected by a line joining the centres of pressure of the pads.

Where means are provided for adjusting the indirectly actuated friction pad to compensate for wear of the pads the rocking movement of the caliper which is required is very small.

According to our invention, in a disc brake of the kind set forth the caliper is carried from a stationary part adjacent to the brake disc by circumferentially spaced pegs or bolts of which the axes are inclined with respect to the plane of the disc and on which the caliper is movable through a limited distance against spring loading.

The axes of the pegs or bolts are parallel to each other and are preferably substantially at right angles to a plane containing a point, defined by the intersection of a plane within the disc containing the resultant drag force and a line joining the centres of pressure of the friction pads, and the points on the pegs or bolts through which this force is transmitted to the stationary part.

Two forms of disc brake embodying our invention are illustrated by way of example in the accompanying drawings in which:

FIGURE 1 is an end view of the brake caliper;
FIGURE 2 is a section of the brake with the caliper in section on the line 2—2 of FIGURE 1;
FIGURE 3 is a similar section with the caliper in section on the line 3—3 of FIGURE 1;
FIGURE 4 is an end view of another brake caliper; and
FIGURE 5 is a section on line 5—5 of FIGURE 4.

In the brake illustrated in FIGURES 1-3 the disc 10 is a radial flange on the free end of an axially extending cup-shaped member 11 secured to a flange 12 on the hub 13 of a vehicle wheel 14. A portion of the periphery of the disc is straddled by a caliper 15 which is formed in two complementary parts secured together by bolts 16, the division being substantially in the central plane of the disc.

An hydraulic cylinder 17 is located in the inboard limb of the caliper and a piston 18 working in the cylinder engages the backing plate 19 of a friction pad 20 which is urged into engagement with the adjacent face of the disc when fluid under pressure is forced into the outer end of the cylinder from a master cylinder or the like.

A second friction pad 21 carried by a backing plate 22 is located on the other side of the disc and is backed by an automatic adjuster 23 of any convenient type.

The friction pads are guided in the caliper for movement towards and away from the disc by means which take the torque on the friction pads when the brake is applied. The caliper has an opening 24 in its radially outermost side of sufficient dimensions to allow the friction pads with their backing plates to be inserted and removed through the opening as described in the specification of our British Patent No. 742,338.

The inboard limb of the caliper in which the hydraulic cylinder is located is formed with two circumferentially spaced lugs 25 extending inwardly at an angle to the plane of the disc as shown more particularly in FIGURE 1. Each lug is secured to a stationary part 26 adjacent to the disc by a bolt 27. The axes of the bolts are parallel to each other and are inclined with respect to the plane of the disc at such an angle that the axes are substantially at right angles to a plane indicated by the line 28 in FIGURE 2 which contains a point defined by the intersection of a plane within the disc containing the resultant drag force and a line joining the centres of pressure of the friction pads, and the points on the bolts through which this force is transmitted to the stationary part 26.

Each bolt 27 is screwed into a tapped hole in the stationary part 26 and passes through a bore drilled in a lug 25. Adjacent to the part 26 the bolt has a shoulder 29 of small axial length which is of substantially the same diameter as the bore and the remainder of the part within the bore is of substantially smaller diameter than the bore. On the outer side of that part, outside the bore, there is a shoulder 30 which is of the same diameter as the shoulder 29, and lies immediately below the head of the bolt.

As shown in the drawing the shoulder 29 is cylindrical over its axial length and cooperates with the cylindrical bore. In another arrangement the shoulder 29 and the portion of the bore with which it co-operates are formed as portions of part spherical outline which facilitate the rocking movement of the caliper.

There is an axial clearance between the head of the bolt and the outer surface of the lug 25, and a deformable resilient washer 31 is fitted over the bolt to take up this clearance and apply to the lug an axially directed spring force holding the lug in engagement with the stationary part 26.

The shoulder 29 forms abutments co-operating with surfaces on the lugs and these abutments and their co-operating surfaces are also substantially at right angles to the plane indicated by line 28.

When the brake is applied the load due to the drag on the caliper is transmitted to the bolts in a direction substantially at right angles to the axes of the bolts and the lower face of the abutment 29 on the bolt 27 with which any given point on the surface of the disc first comes into alignment in the normal direction of rotation is in compression with its co-operating surface on the lug 25, the component of the load in the direction of the axes of the bolts being substantially zero so that the alignment of the friction pads with the disc is not affected. In the reverse direction of rotation the upper face of the abutment 29 on that bolt 27 is in compression with its co-operating surface on the lug 25.

In the application of the brake the friction pad 20 is applied to the disc by the piston 18 and the pad 21 is applied to the opposite face of the disc by the reaction on the caliper, and the movement of the caliper relative to the disc is only that required to take up the running clearances between the friction pads and the disc. The clearances are maintained substantially constant by the automatic adjuster, and the movement of the caliper relative to the disc in the application of the brake does not increase with wear of the friction pads.

In another embodiment of brake illustrated in FIGURES 4 and 5 where corresponding reference numerals have been used to indicate corresponding parts the caliper 15 is mounted on a leaf spring 41 to which it is secured by two circumferentially spaced bolts 42.

The leaf spring is bifurcated and has leg portions 43 which extend at an angle to the plate of the disc 10. Each leg portion is secured to a stationary part 44 by a bolt 45 passing through and hole in the leg portion and screwed into the stationary part. The axes of the bolts 45 are parallel to each other and are inclined with respect to the plane of the disc at such an angle that the axes are substantially at right angles to a plane indicated by line 46 which contains a point, defined by the intersection of a plane within the disc containing the resultant drag force and a line joining the centres of pressure of the friction pads, and the points on the bolts 45 through which this force is transmitted to the stationary part 44.

The leaf spring 41 has considerable lateral stiffness but is flexible in a direction to allow the caliper to move towards and away from the disc.

The operation of the brake in accordance with this embodiment is substantially the same as the operation of the embodiments described above with reference to FIGURES 1–3 but with the exception that operation of the deformable resilient washer 31 is replaced by the resilience of the leaf spring 41.

Although the invention has been described with reference to a caliper which is adapted to straddle a portion of the outer periphery of a rotatable disc it is to be understood that the invention is also intended to include a caliper adapted to straddle a portion of the inner periphery of a rotatable disc or ring.

I claim:
1. A disc brake comprising a rotatable disc, a caliper adapted to straddle a portion of the periphery of the disc, friction pads for engagement with opposite faces of said disc mounted in the caliper, said caliper being carried from a stationary part adjacent to the disc by circumferentially spaced bolts relative to which the caliper is movable through a limited distance against spring loading, the axes of the bolts being inclined with respect to the plane of the disc and being substantially at right angles to a plane containing a point, defined by the intersection of a plane within the disc containing the resultant drag force and a line joining the centres of pressure of the friction pads, and the points on the bolts through which this force is transmitted to the stationary part.

2. A disc brake comprising an axially fixed rotatable disc, a caliper adapted to straddle a portion of the periphery of the disc and permitted a limited rocking movement relative to the disc, friction pads for engagement with opposite faces of said disc mounted in said caliper, actuating means for applying one of said friction pads to one face of said disc located in said caliper, said actuated friction pad being mounted in said limb for movement towards and away from said disc, said other friction pad being applied to the opposite face of said disc by the reaction on the caliper, a pair of circumferentially spaced bolts secured to a stationary part adjacent to said disc from which said caliper is carried, the axes of the bolts being parallel to each other and inclined with respect to the plane of the disc substantially at right angles to a plane containing a point defined by the intersection of a plane within the disc containing the resultant drag force and a line joining the centres of pressure of the friction pads, and the points on the bolts through which this force is transmitted to the stationary part, and spring means associated with said bolts and against which said caliper is movable through said limited movement.

3. A disc brake as claimed in claim 2 in which the caliper is mounted on the stationary part by bolts screwed into the stationary part and passing through bores in lugs extending inwardly from the limb of the caliper in which the actuating means is located, the diameter of the bolts over the greater portion of the length within the bores being less than that of the bores and resilient deformable washers being located between the heads of the bolts and the lugs.

4. A disc brake as claimed in claim 2, in which the caliper is mounted on a stationary part by bolts screwed into the stationary part and passing through holes in leg portions of a bifurcated leaf spring secured to the caliper, the leaf spring being inclined with respect to the caliper substantially in said plane relative to which said bolts are arranged substantially at right angles.

References Cited by the Examiner

UNITED STATES PATENTS

| 2,351,041 | 6/1944 | Hawley | 188—152 |
| 2,873,005 | 2/1959 | Butler | 188—73 |
| 3,090,468 | 5/1963 | Von Rucker | 188—73 |

FOREIGN PATENTS

| 616,746 | 3/1961 | Canada. |
| 1,089,618 | 10/1954 | France. |

MILTON BUCHLER, *Primary Examiner.*

ARTHUR L. LA POINT, *Examiner.*

G. HALVOSA, *Assistant Examiner.*